US012404978B2

(12) United States Patent

Doubek et al.

(10) Patent No.: US 12,404,978 B2

(45) Date of Patent: Sep. 2, 2025

(54) LIGHTING DEVICES AND METHODS FOR INSTALLING AND REPAIRING THE SAME

(71) Applicant: Dado Lighting, LLC, Indian Head Park, IL (US)

(72) Inventors: David E. Doubek, Indian Head Park, IL (US); Noah Goldstein, Indian Head Park, IL (US)

(73) Assignee: Dado Lighting, LLC, Indian Head Park, IL (US)

( * ) Notice: Subject to any disclaimer, the term of this patent is extended or adjusted under 35 U.S.C. 154(b) by 1 day.

(21) Appl. No.: 18/598,290

(22) Filed: Mar. 7, 2024

(65) Prior Publication Data

US 2024/0302007 A1 Sep. 12, 2024

Related U.S. Application Data

(60) Provisional application No. 63/489,651, filed on Mar. 10, 2023.

(51) Int. Cl.

| | |
|---|---|
| ***F21V 17/10*** | (2006.01) |
| ***F21S 4/20*** | (2016.01) |
| ***F21S 4/28*** | (2016.01) |
| ***F21V 17/16*** | (2006.01) |
| ***F21V 23/00*** | (2015.01) |
| ***F21V 29/70*** | (2015.01) |
| *F21Y 113/00* | (2016.01) |
| *F21Y 115/10* | (2016.01) |

(52) U.S. Cl.

CPC . *F21S 4/20* (2016.01); *F21S 4/28* (2016.01); *F21V 17/105* (2013.01); *F21V 17/164* (2013.01); *F21V 23/001* (2013.01); *F21V 29/70* (2015.01); *F21Y 2113/00* (2013.01); *F21Y 2115/10* (2016.08)

(58) Field of Classification Search

CPC .... F21V 17/164; F21V 17/105; F21V 19/003; F21S 4/20; F21S 4/28

See application file for complete search history.

(56) References Cited

U.S. PATENT DOCUMENTS

| | | | | |
|---|---|---|---|---|
| 10,190,738 | B1 * | 1/2019 | James | F21S 4/28 |
| 11,149,933 | B2 * | 10/2021 | Shi | H05K 1/18 |
| 11,473,743 | B1 * | 10/2022 | Lin | F21V 17/12 |
| 12,098,828 | B1 * | 9/2024 | Irons | F21V 15/015 |
| 2016/0356470 | A1 * | 12/2016 | Noh | F21V 29/74 |
| 2016/0369958 | A1 * | 12/2016 | Kohshima | F21S 4/28 |

* cited by examiner

*Primary Examiner* — Eric T Eide

(74) *Attorney, Agent, or Firm* — Nixon Peabody LLP

(57) ABSTRACT

A lighting device includes a housing, a plurality of clips, a ferromagnetic strip, a light source, and a lens. The housing includes a base, a first side wall, a second side wall defining an interior cavity. Each of the plurality of clips is coupled to the housing and includes a magnet. The ferromagnetic strip is coupled to the housing via the magnets of the plurality of clips. The light source is disposed within the interior cavity of the housing and coupled to the ferromagnetic strip. The lens is disposed within the interior cavity of the housing.

28 Claims, 7 Drawing Sheets

LIGHTING DEVICES AND METHODS FOR INSTALLING AND REPAIRING THE SAME

CROSS REFERENCE TO RELATED APPLICATIONS

This application claims the benefit of, and priority to, U.S. Provisional Application No. 63/489,651, filed Mar. 10, 2023, which is hereby incorporated by reference herein in its entirety.

TECHNICAL FIELD

The present disclosure relates generally to lighting devices, and more particularly, to lighting devices including a plurality of clips for supporting a removable ferromagnetic strip, and methods for installing the same.

BACKGROUND

Lighting devices are often integrated in a structure such as a wall or ceiling. Many of these lighting devices include a light emitting diode (LED) strip within a housing that is covered by a lens. In some examples, the housing is installed, then the LED strip unrolled and attached within the housing (e.g., using an adhesive), and then covered (e.g., by the lens). Often, after installation, one or more of the LEDs in the LED strip will fail such that either the entire LED strip or at least a portion of the LED strip will no longer illuminate. In this case, it is necessary to replace the failed LED strip. However, once the lighting device is installed (e.g., in a ceiling or wall), it is difficult to remove the LED strip from within the housing to replace it. It is especially difficult to remove the LED strip when the housing is very thin (e.g., only about 3 inches wide). Further, when adhered to the housing, it is difficult to remove all of the residual adhesive after removing the LED strip. This residual adhesive can inhibit contact between a new LED strip and the housing. The present disclosure is directed to solving these and other problems.

SUMMARY

According to some implementations of the present disclosure, a lighting device includes a housing, a plurality of clips, a ferromagnetic strip, a light source, and a lens. The housing includes a base, a first side wall, a second side wall defining an interior cavity. Each of the plurality of clips is coupled to the housing and includes a magnet. The ferromagnetic strip is coupled to the housing via the magnets of the plurality of clips. The light source is disposed within the interior cavity of the housing and coupled to the ferromagnetic strip. The lens is disposed within the interior cavity of the housing.

According to some implementations of the present disclosure, a method for installing a lighting device includes positioning a housing within a slot in an external structure. The method also includes coupling a plurality of clips to the housing. Each of the plurality of clips includes a magnet. The method also includes coupling a ferromagnetic strip to the housing via the magnets of the plurality of clips. A light source is coupled to the ferromagnetic strip. The method also includes coupling a lens to the housing subsequent to coupling the ferromagnetic strip to the plurality of clips.

According to some implementations of the present disclosure, a method for repairing an installed lighting device includes decoupling a lens from a housing, the housing being positioned within a slot in an external structure. The method also includes decoupling a first ferromagnetic strip from a plurality of clips, each of the plurality of clips being coupled to the housing and including a magnet, wherein a first light source is coupled to the ferromagnetic strip. The method also includes decoupling a first ferromagnetic strip from a plurality of clips. Each of the plurality of clips being coupled to the housing and including a magnet, wherein a first light source is coupled to the first ferromagnetic strip. The method also includes coupling a second ferromagnetic strip to the plurality of clips, wherein a second light source is coupled to the ferromagnetic strip. The method also includes re-coupling the lens to the housing.

The above summary is not intended to represent each implementation or every aspect of the present disclosure. Additional features and benefits of the present disclosure are apparent from the detailed description and figures set forth below.

Figure 1:
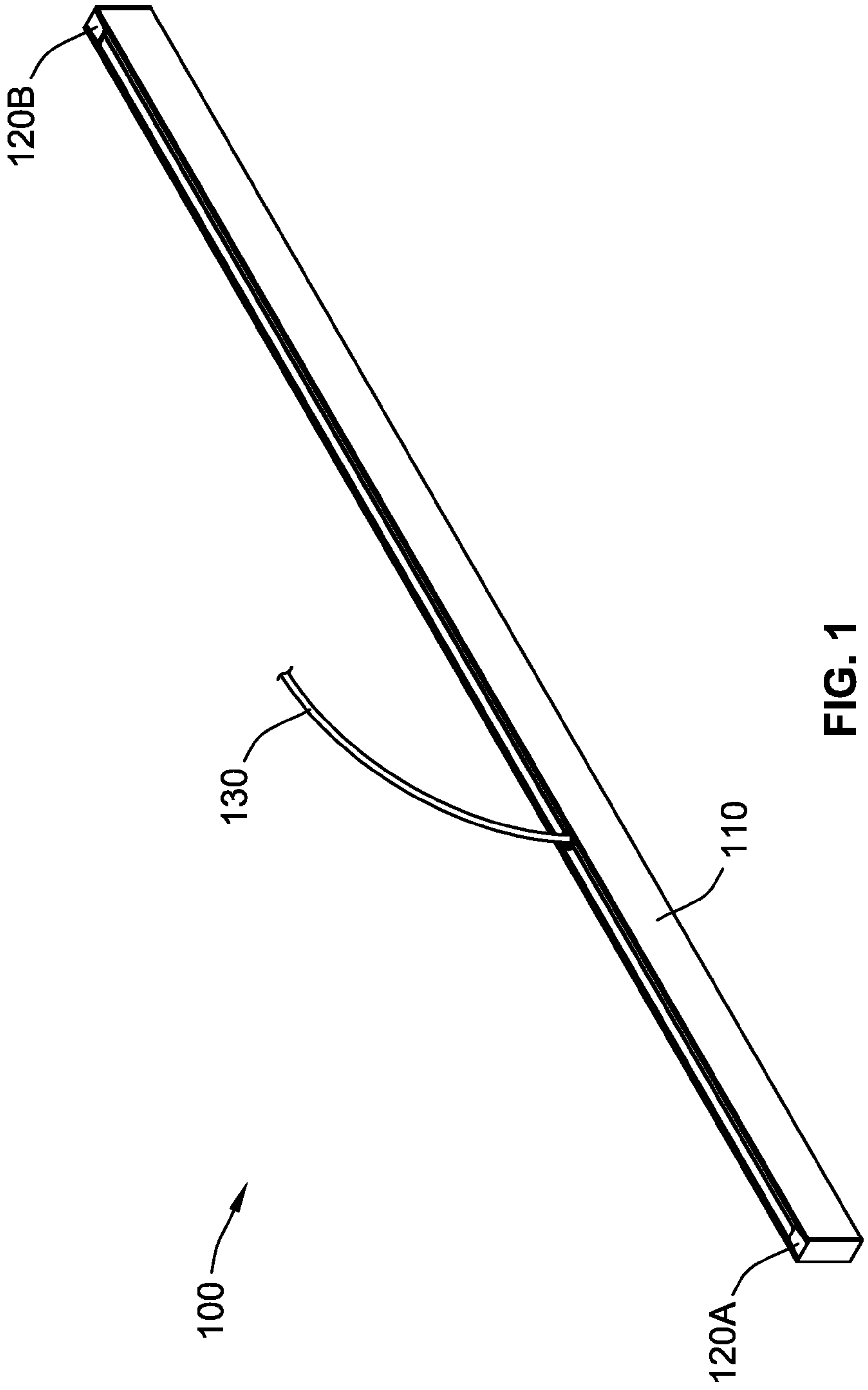
FIG. 1 is an assembled perspective view of a lighting device, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

Figure 2:
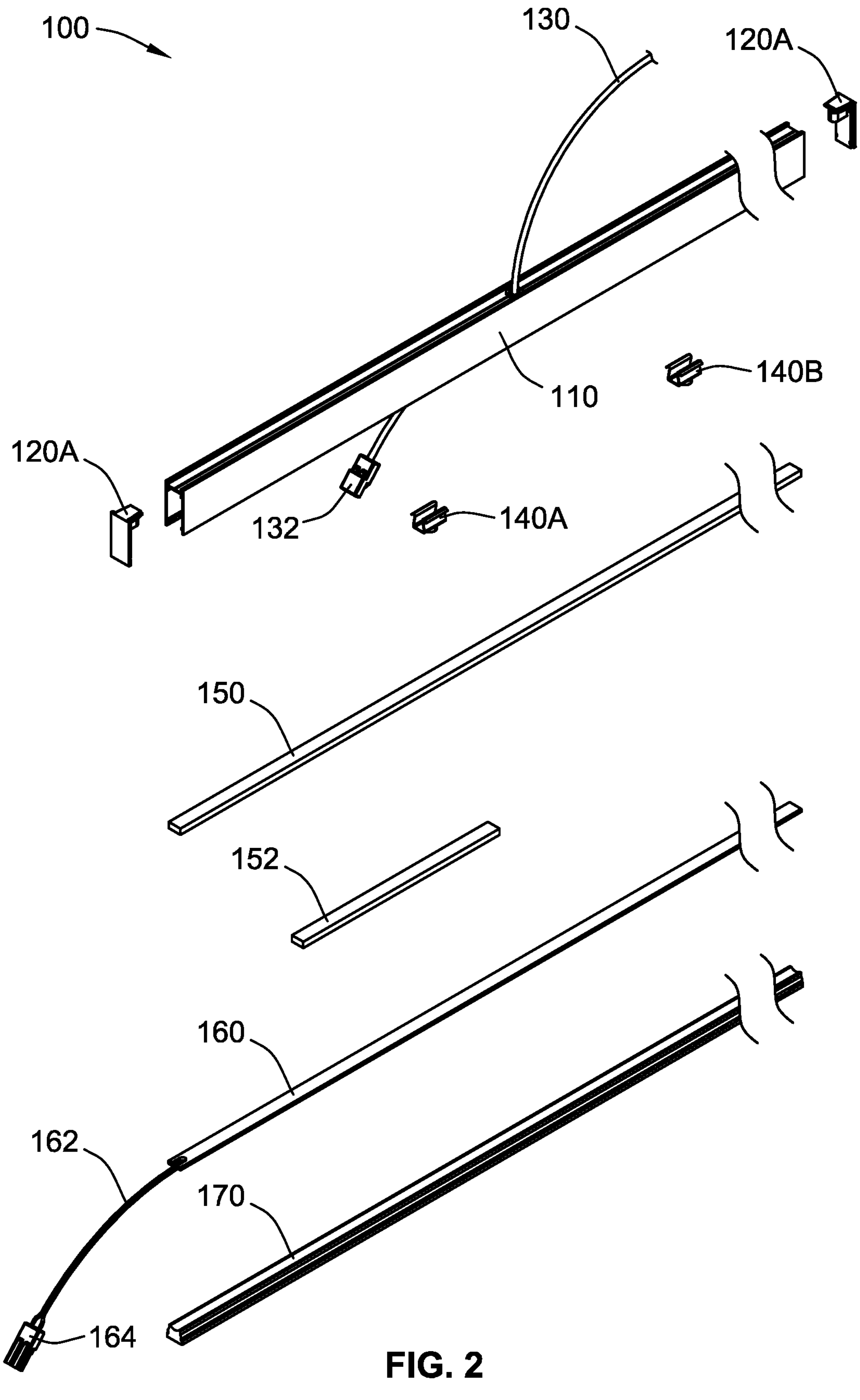
FIG. 2 is an exploded perspective view of the lighting device of FIG. 1, according to some implementations of the present disclosure.

Referring to FIGS. 1 and 2, a lighting device 100 according to some implementations of the present disclosure is illustrated. The lighting device 100 includes a housing 110, a pair of end caps 120A-120B, an external power cable 130, a plurality of clips 140A-140B, a ferromagnetic strip 150, a light source 160, and a lens 170. As described herein, the lighting device 100 can be mounted with a slot formed in an external structure (e.g., a ceiling, a wall, furniture, etc.) such that the lens 170 is generally flush with a finished surface of the external structure.

Figure 3:
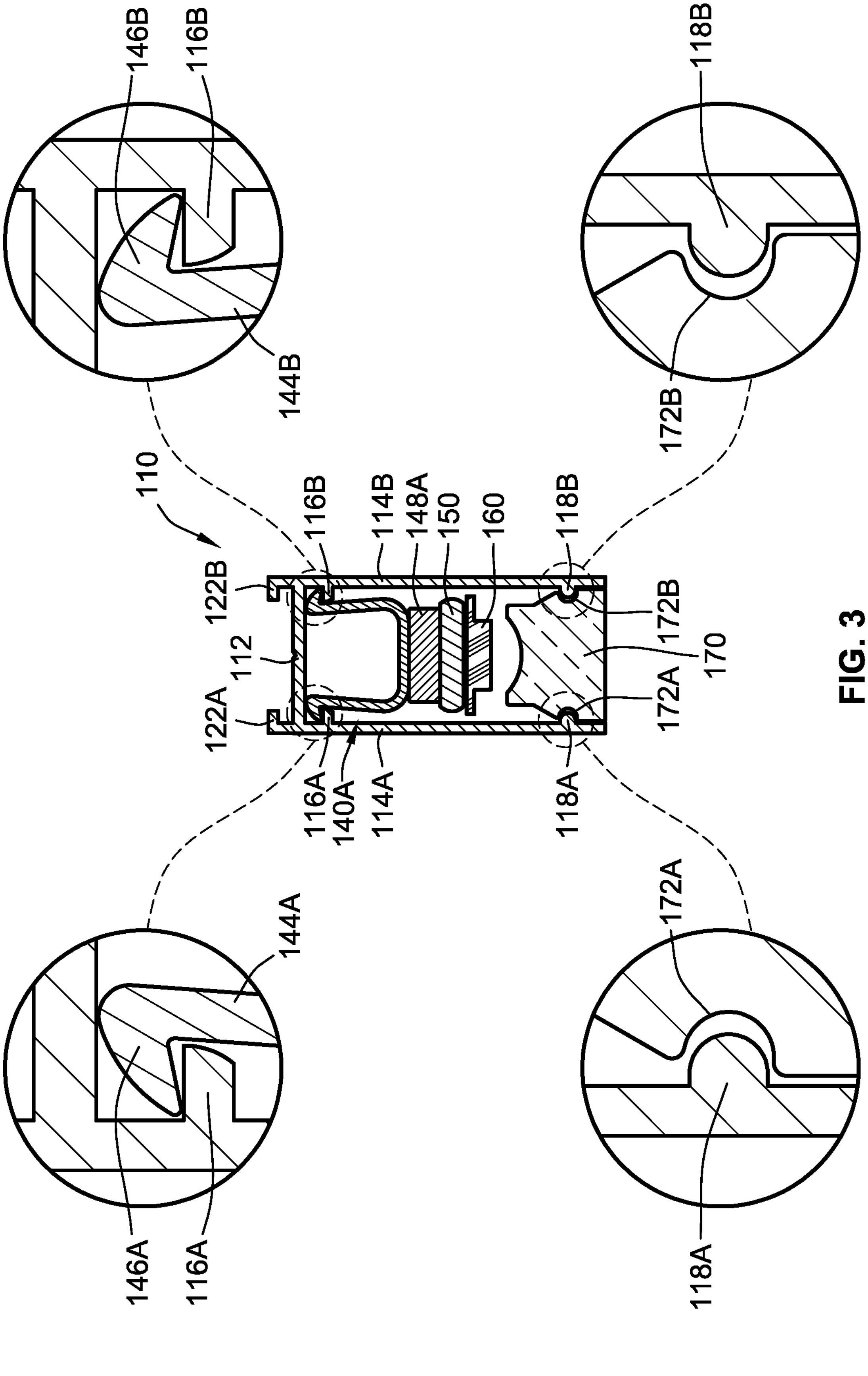
FIG. 3 is a cross-sectional view of the lighting device of FIG. 1, according to some implementations of the present disclosure.

Referring to FIG. 3, the housing 110 includes a base 112, a first side wall 114A, and a second side wall 114B. The first side wall 114A and the second side wall 114B generally extend from the base 112 and define an internal cavity of the housing 110. The first side wall 114A includes a first flange 116A that protrudes into the internal cavity and the second side wall 114B includes a second flange 116B that also protrudes into the internal cavity. The first flange 116A and the second flange 116B generally aid in coupling the plurality of clips 140A-140B to the housing 110 (e.g., via a snap fit connection).

The first side wall 114A includes a first protrusion 118A that protrudes into the internal cavity and the second side wall 114B includes a second protrusion 118B that also protrudes into the internal cavity. The first protrusion 118A and the second protrusion 118B have a generally semi-circular shape and generally aid in coupling the lens 170 to the housing 110 (e.g., via a snap fit connection).

The first side wall 114A and the second side wall 114B also include a first bracket 122A and a second bracket 122B, respectively. The first bracket 122A and the second bracket 122B define a groove that extends along the length of an upper surface of the base 112 of the housing 110. As described herein, the first bracket 122A and the second bracket 122B aid in coupling the first end cap 120A and the second end cap 120B to the housing 110 (e.g., via a press or interference fit connection) and/or coupling additional mounting brackets to the housing 110 (e.g., for coupling or mounting the housing 110 to a surface or structure).

As shown in FIGS. 1 and 2, the housing 110 includes an aperture formed through the base 112 (FIG. 3) to allow a portion of the external power cable 130 to be disposed within the housing 110. The external power cable 130 includes a connector 132 that can be coupled to a corresponding connector 164 of a power cable 162 of the light source 160 to power the light source 160 (FIG. 2). The external power cable 130 is connected to an external power source or supply (e.g., an AC electrical power source). In some implementations, the external power cable 130 includes or is coupled to a AC/DC converter for converting power from an AC electrical outlet. In some implementations, the lighting device 100 further includes a power supply enclosure that includes one or more constant voltage or constant current drivers (e.g., three drivers) for powering the light source 160. As described herein, the lighting device 100 can be used in system including multiple lighting devices. In such implementations, the external power cable 130 can be coupled to a power supply enclosure that is also coupled to power cables from one or more additional lighting devices that are the same as, or similar to, the lighting device 100.

The housing 110 comprises a material (e.g., aluminum, steel, stainless steel, etc.) that aids in absorbing and/or distributing heat generated by the light source 160 so that the housing 110 acts a heat sink. As shown, the housing 110 is a unitary and/or monolithic component. In other implementations, the housing 110 can comprise one or more components that are coupled (e.g., welded) together. In some implementations, the housing 110 has a width of about 0.625 inches, a length of about 72 inches, and a height of about 1.5 inches. In some implementations, the housing 110 also includes a scribed line extending along a surface of the base 112. For example, the scribed line can be a notch or channel that extends along the longitudinal axis of the housing 110 that aids in drilling one or more aperture in the base 112 of the housing 110 for one or more fasteners.

Figure 6A:
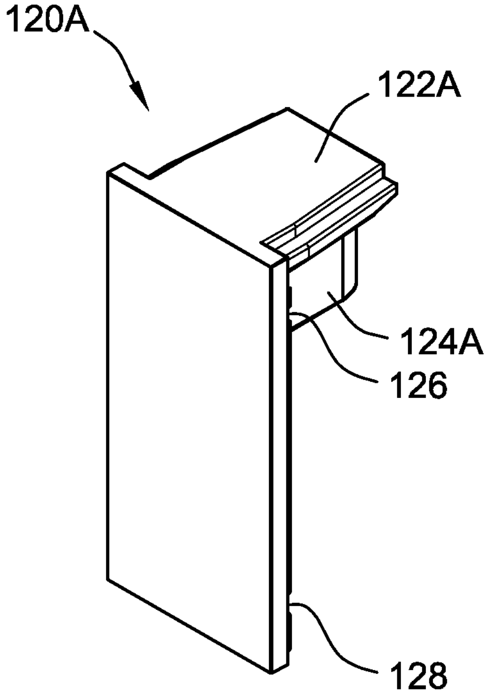
FIG. 6A is a first perspective view of an end cap of the lighting device of FIG. 1, according to some implementations of the present disclosure.
Figure 6B:
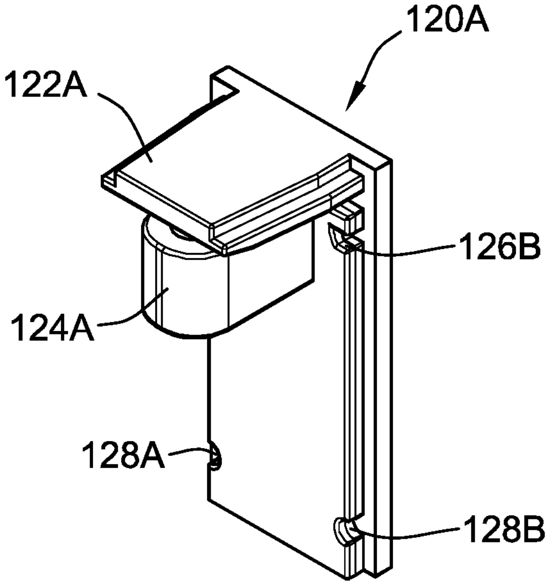
FIG. 6B is a second perspective view of the end cap of the lighting device of FIG. 1, according to some implementations of the present disclosure.

Referring to FIGS. 6A and 6B, the first end cap 120A includes a first tongue portion 122A and a second tongue portion 124A. The first tongue portion 122A is sized and shaped to engage the groove defined by the first bracket 122A and the second bracket 122B of the housing 110 (FIG. 3) to couple the first end cap 120A to the housing 110 (e.g., via a press or interference fit). The second tongue portion 124A is sized and shaped to engage a portion of one of the plurality of clips 140A-140B. The first end cap 120A also includes a first pair of notches 126*a*-126*b* and a second pair of notches 128*a*-128*b*. The first pair of notches 126*a*-126*b* are sized and shaped to engage the first flange 116A and second flange 116B of the housing 110 (FIG. 3) to aid in coupling the first end cap 120A to the housing 110. Similarly, the second pair of notches 128*a*-128*b* are sized and shaped to engage the first protrusion 118A and second protrusion 118B of the housing 110 (FIG. 3) to aid in coupling the first end cap 120A to the housing 110. The second end cap 120B (FIGS. 1-2) is the same as, or similar to, the first end cap 120A and is coupled to the opposite end of the housing 110.

Figure 4A:
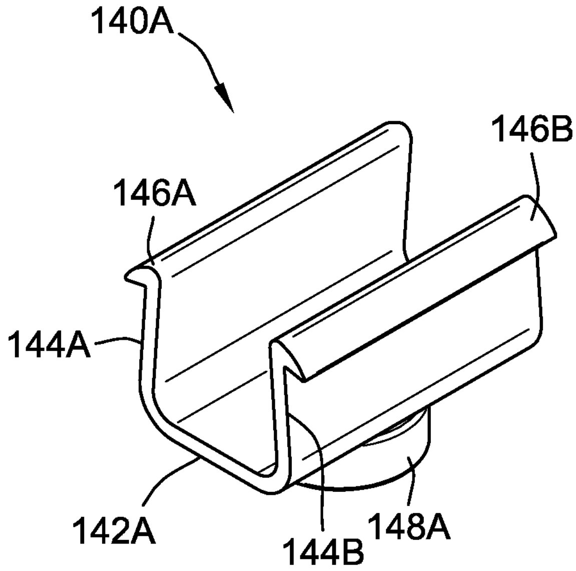
FIG. 4A is a first perspective view of a clip of the lighting device of FIG. 1, according to some implementations of the present disclosure.
Figure 4B:
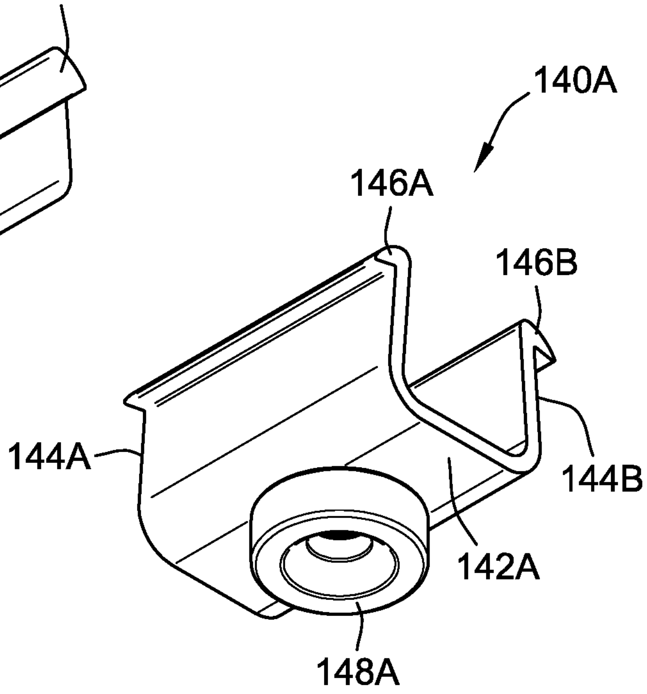
FIG. 4B is a second perspective view of the clip of the lighting device of FIG. 1.

Referring to FIGS. 4A and 4B, a first clip 140A includes a base 142A, a first deflectable arm 144*a*, a second deflectable arm 144*b*, and a magnet 148A. The first clip 140A and the second clip 140B can be removably coupled to the housing 110 and are generally configured to support the ferromagnetic strip 150 within the housing 110. The magnet 148A is generally circular and coupled to the base 142A. As described herein, the magnet 148A couples the clip 140A to the ferromagnetic strip 150 via a magnetic connection. The first deflectable arm 144*a* is moveable relative to the base 142A and includes a first hook 146*a*. As shown in FIG. 3, the first hook 146*a* engages the first flange 116A of the housing 110 to aid in coupling the first clip 140A to the housing 110. Similarly, the second deflectable arm 144*b* is moveable relative to the base 142A and includes a second hook 146*b* that engages the second flange 116B of the housing 110 to aid in coupling the first clip 140A to the housing 110. The space between the first deflectable arm 144*a* and the second deflectable arm 144*b* allows a portion of the power cable 130 and/or the power cable 162 to pass through the first clip 140A when the first clip 140A is coupled to the housing 110 (e.g., as shown in FIGS. 3 and 5).

Referring back to FIG. 2, the second clip 140B is the same as or similar to the first clip 140A. While the lighting device 100 is shown as including two clips (the first clip 140A and the second clip 140B), more generally, the lighting device 100 can include any suitable number of clips (e.g., 1 clip, 3 clips, 5 clips, 10 clips, etc.) for supporting the ferromagnetic strip 150 within the housing 110. Similarly, the plurality of clips 140A and 140B can be coupled to the housing 110 at any suitable location along the length of the housing 110.

For example, the plurality of clips 140A and 140B can be spaced by a predetermined distance (e.g., between about 1 foot and about 3 feet, between about 2 feet and about 6 feet, between about 1 foot and 10 feet, etc.) to aid in supporting the ferromagnetic strip 150. The plurality of clips 140A-140B can comprise a polymer material, spring steel, brass, bronze, or any combination thereof.

Figure 5:
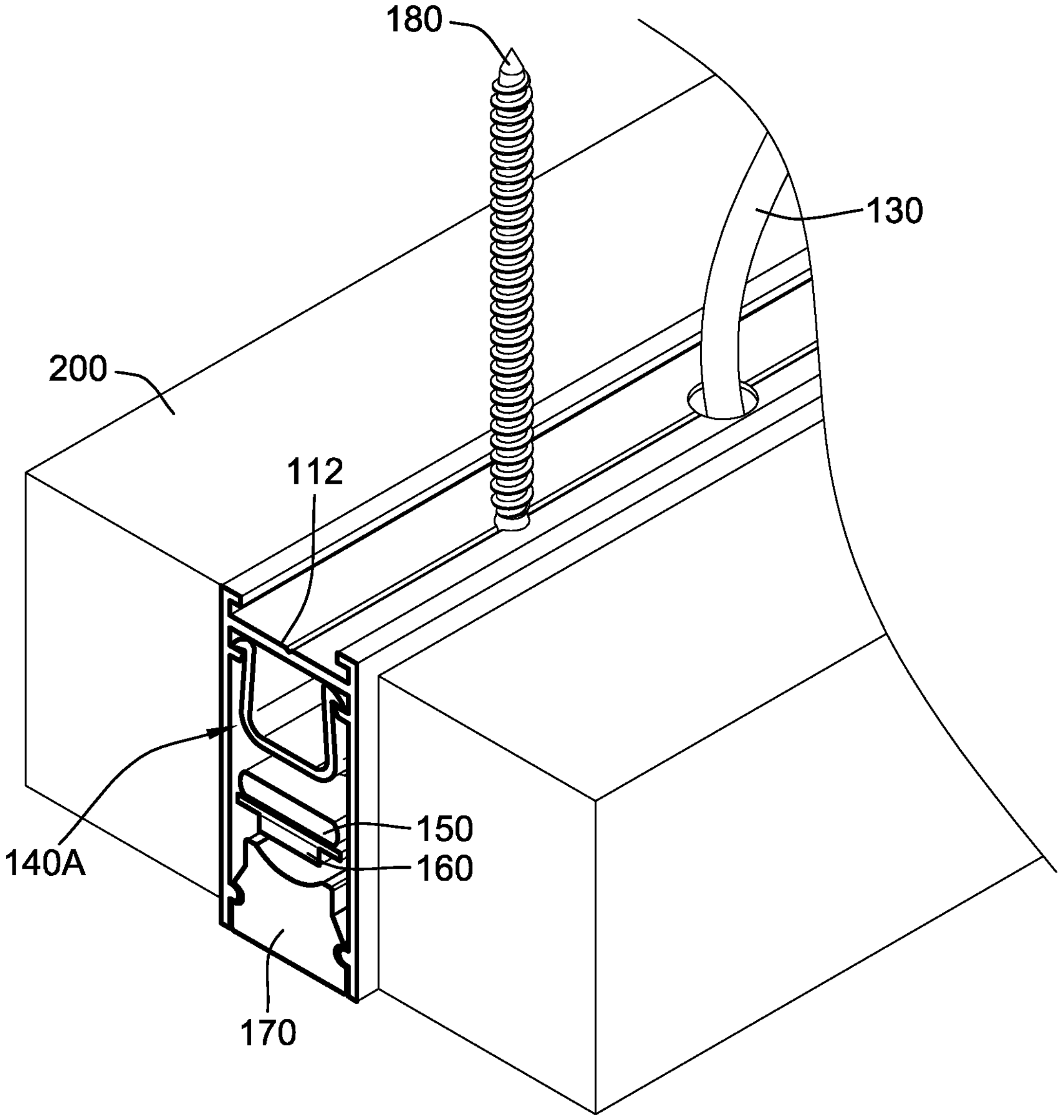
FIG. 5 is an assembled perspective view of the lighting device of FIG. 1 installed in a slot in an external structure, according to some implementations of the present disclosure.

Referring to FIGS. 2-3 and 5, the ferromagnetic strip 150 has a generally rectangular shape and comprises a ferromagnetic material (e.g., steel, ultra-low carbon steel, iron, nickel, alloys thereof, etc.). The ferromagnetic strip 150 is sized and shaped so that it can be disposed within the internal cavity of the housing 110 between the first side wall 114A and the second side wall 114B. As shown in FIGS. 3 and 5, the ferromagnetic strip 150 is removably coupled to the housing 110 via the magnets of the plurality of clips 140A-140B (e.g., the magnet 148A of the first clip 140A). The magnetic coupling between the plurality of clips 140A-140B is strong enough to support the weight of the ferromagnetic strip 150 and the light source 160 coupled thereto, while also allowing a user to remove the ferromagnetic strip 150 and light source 160 from the housing 110 by pulling the ferromagnetic strip 150 down away from the plurality of clips 140A-140B. In some implementations, the ferromagnetic strip 150 extends along substantially the entire length of the housing 110. In other implementations, the lighting device 100 can include a plurality of ferromagnetic strips that are the same as, or similar to, the ferromagnetic strip 150 that collectively extend along substantially the entire length of the housing 110.

In some implementations, the ferromagnetic strip 150 includes a protective coating that aids in dissipating heat from the ferromagnetic strip 150 that was transferred from the light source 160 and also aids in inhibiting corrosion of the ferromagnetic strip 150 (e.g., in humid or outdoor environments). In such implementations, the protective coating on the ferromagnetic strip 150 can be, for example, a Zn and Al alloy.

Referring to FIGS. 2-3 and 5, the light source 160 includes a power cable 162 (FIG. 3) and is generally used to illuminate light. The power cable 162 includes a connector 164 (FIG. 3) that is configured to electrically couple the light source 160 to the power cable 130 via the connector 132 to power the light source 160 for illumination. The light source 160 is coupled to the ferromagnetic strip 150 via at least one adhesive strip 152 (e.g., two adhesive strips, five adhesive strips, 10 adhesive strips, 25 adhesive strips, etc.). As shown in FIGS. 3 and 5, when coupled to the ferromagnetic strip 150, the light source 160 is positioned to emit light towards the lens 170.

The adhesive strip 152 is a double-sided adhesive that adheres to both the ferromagnetic strip 150 and the light source 160. In some implementations, the adhesive strip 152 can have a width of about 0.75 inches and a length of about 3 inches. In some cases, heat generated by the light source 160 may cause degradation of the adhesive strip 152 (e.g., reducing its holding power). Thus, the adhesive strip 152 preferably has a heat resistance rating of about 120 degrees Fahrenheit. To secure the light source 160 to the ferromagnetic strip 150, the adhesive strip 152 can have a peel adhesion that is between about 35 oz/in (N/100 mm) and about 70 oz/in (N/100 mm). The adhesive strip 152 can have a first side having a first peel adhesion value and a second opposing side having a second peel adhesion value that is different than the first peel adhesion value to aid in securing the light source 160 to the ferromagnetic strip 150. Such double-sided tapes are particularly advantageous for coupling the light source 160 to the ferromagnetic strip 150, for example, due to their holding power, heat resistance, heat sinking properties, thermal bond properties, etc. While the lighting device 100 is shown as including one adhesive strip 152, more generally, the lighting device 100 can include any suitable number of adhesive strips that are the same as, or similar to, the adhesive strip 152 (e.g., two adhesive strips, five adhesive strips, ten adhesive strips, etc.).

In some implementations, the light source 160 includes a support substrate and a plurality of light emitting diodes (LEDs) coupled to the support substrate. The light source 160 can also include an encapsulant (e.g., comprising silicon) that at least partially surrounds the plurality of LEDs. The support substrate can be a rigid board or plate, a flexible strip or film, a printed circuit board, etc. The plurality of LEDs can include white LEDs, blue LEDs (e.g., III-nitride LEDs), red LEDs, green LEDs, yellow LEDs, amber LEDs, orange LEDs, infrared LEDs, ultraviolet LEDs, or any combination thereof. The plurality of LEDs can be dimmable (e.g., together or individually controllable). The plurality of LEDs can be mounted to the support substrate using any suitable packaging technique (e.g., a surface mount package, a through-pin package, etc.). Further, the plurality of LEDs can be electrically coupled to one another using any suitable mechanism or technique (e.g., in series, in parallel, via wiring, via traces, etc.). The encapsulant protects the plurality of LEDs (e.g., from mechanical damage) and/or modifies the light emission characteristics. For example, the encapsulant can include a wavelength converter (e.g., a phosphor material) that converts a first wavelength of light emitted by the LEDs (e.g., blue) to a second wavelength of light (e.g., white), which is then emitted from encapsulant. In some implementations, the power of the light source 160 is about 1 Watt per foot (e.g., sometimes referred to as ultra-low wattage).

While the lighting device 100 is shown as including one light source 160, in some implementations, the lighting device 100 includes a plurality of light sources that are the same as, or similar to, the light source. In such implementations, a first one of the light sources can be positioned within the housing 110 (e.g., coupled to the housing 110 via one or more ferromagnetic strips and clips). In such implementations, the light first light source can emit a first wavelength of light (e.g., white light) and the second light source can emit a second wavelength of light or a plurality of wavelengths of light (e.g., red light, blue light, green light, etc.). The plurality of light sources can be tuned or adjusted to create a white or warm dim effect that avoids the pink effect that is visible when the color delta is greater than 2000K and the dimming curve no longer follows the black body dimming curve.

Referring to FIG. 3, the lens 170 includes a first notch 172A and a second notch 172B on opposing sides of the lens 170. As shown, the first notch 172A engages the first protrusion 118A of the housing 110 and the second notch 172B engages the second protrusion 118B of the housing 110 to removably couple the lens 170 to the housing 110 (e.g., via a snap fit connection). Further, as shown, the lens 170 is generally flush with the ends of the side walls 114A and 114B when coupled to the housing 110. Thus, the lens 170 is generally flush with a surface of the external structure in which the lighting device 100 is inserted when installed. Once coupled to the housing 110, the lens 170 can be removed (e.g., by inserting a tool or shim between an edge of the lens 170 and the housing 110) and then re-coupled to the housing 110 (e.g., to facilitate removing the ferromagnetic strip 150 from within the housing 110, as described below).

The lens 170 generally comprises a material (e.g., a polymer) for allowing light to pass through so that light emitted from the light source 160 is emitted outside of the lens 170. Generally, the lens 170 aids in diffusing or distributing light emitted by the light source 150 outside of the lighting device 100. In some implementations, the lens 170 comprises a generally flexible material that permits deflection of the first notch 172A and/or the second notch 172B to aid in forming a snap fit coupling between the lens 170 and the housing 110. In some implementations, the lens 170 comprises a generally rigid material that is biased against flexing or deflection. In some implementations, the lens 170 includes a frosted surface or material (e.g., a material that is roughened, textured, or patterned) to aid in diffusing light in all directions. In some implementations, the lens 170 has a width and a length that is substantially equal to the length and width of the housing.

As shown, the ends of the lighting device 100 are generally straight (e.g., the housing 110 and the lens 170 have a generally rectangular profile). However, in some implementations, the lighting device 100 can include one or more mitered ended. In such implementations, the mitered end(s) appear as if cut at an angle that is, for example, between about 30 degrees and about 80 degrees (e.g., 45 degrees, 60 degrees, 75 degrees, etc.). A first lighting device with a mitered end can be positioned to abut another lighting device with a mitered end to form a miter joint such that a longitudinal axis of the first lighting device is at angle (e.g., 90 degrees) relative to a longitudinal axis of the second lighting device.

Figure 7A:
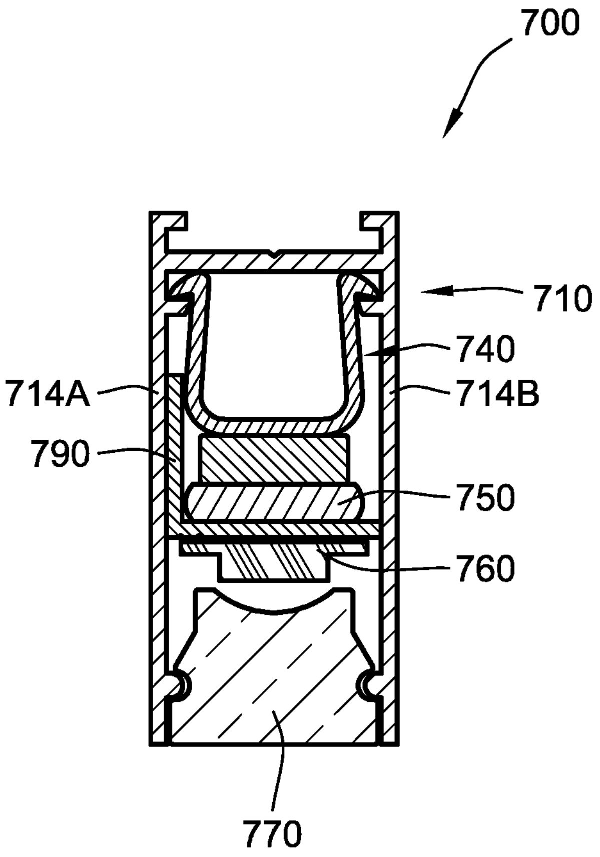
FIG. 7A is a cross-sectional view of a lighting device according to some implementations of the present disclosure.
Figure 7B:
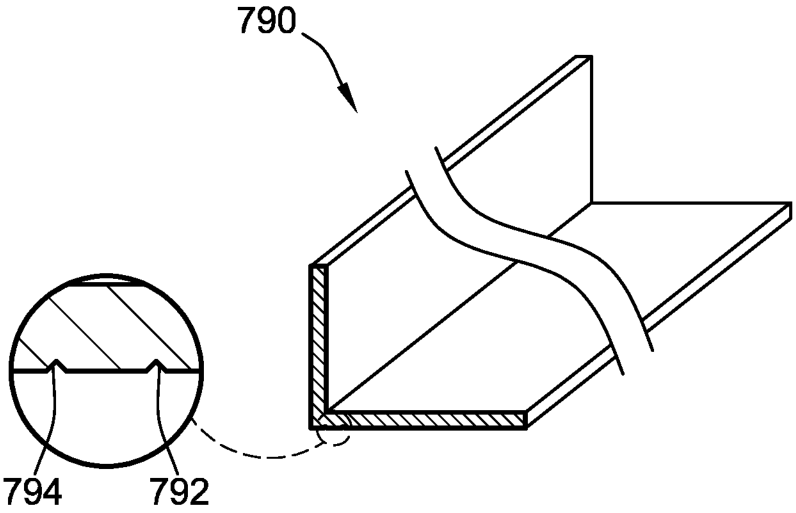
FIG. 7B is a perspective view of a heat sink bracket of the lighting device of FIG. 7A, according to some implementations of the present disclosure.

Referring to FIGS. 7A and 7B, a lighting device 700 according to some implementations of the present disclosure is illustrated. The lighting device 700 is similar to the lighting device 100 and includes a housing 710, a plurality of clips (including clip 740A), a ferromagnetic strip 750, a light source 760, and a lens 770, each of which being the same as, or similar to, the housing 110, the clip 140A, the ferromagnetic strip 150, the light source 160, and the lens 170 described herein.

As described herein, the light source of the lighting device generates heat during operation and the housing and/or ferromagnetic strip can act as a heat sink to aid in preventing overheating of the light source (e.g., which may cause the light source to fail or reduce its lifetime). In the lighting device 100, the ferromagnetic strip 150 coupled to the light source 160 is not in direct contact with the housing 110, so there is no direct, conductive heat transfer between the light source 160 and ferromagnetic strip 150 and the housing 110 (e.g., the dominant heat transfer mechanism between the ferromagnetic strip 150 and the housing 110 is radiation in the lighting device 100). In some implementations, the light source 160 of the lighting device 100 has a power of about 1 Watt per foot, while the light source 760 of the lighting device 700 has a power of about 10 Watts per foot. In the case of the light source 760, the additional heat generated by the light source 760 may not effectively transfer from the light source 760 to the housing 710 (e.g., by radiation heat transfer alone).

The lighting device 700 differs from the lighting device 100 in that the lighting device 700 includes a heat sink bracket 790. As shown in FIG. 7A, the heat sink bracket 790 is coupled to the ferromagnetic strip 750 and contacts a portion of the housing 710. The heat sink bracket 790 can be coupled to the ferromagnetic strip 750, for example, via an adhesive connection, welding, one or more fasteners, etc. Specifically, in the example illustrated in FIG. 7A, a first portion of the heat sink bracket 790 is positioned between the ferromagnetic strip 750 and the light source 760, and a second portion of the heat sink bracket 790 contacts the first side wall 714A of the housing 710. The contact between the heat sink bracket 790 and the housing 710 permits heat transfer (e.g., conduction) between the light source 760 and the housing 710. The second portion of the heat sink bracket 790 is not coupled to the first side wall 714A of the housing 710 such that the ferromagnetic strip 750 and the light source 760 can be removed from the housing 710 (e.g., as described below in connection with the method 900). The heat sink bracket 790 can comprise a metal material (e.g., aluminum, alloys thereof, etc.). The heat sink bracket 790 and the housing 710 can comprise the same material, or different materials.

As shown in FIG. 7B, the heat sink bracket 790 is generally L-shaped and includes a first score line 792 and a second score line 794. The first score line 792 and the second score line 794 aid in aligning the light source 760 in the center of the heat sink bracket 790 based on the width of the light source 760. While the heat sink bracket 790 is shown as described herein being generally L-shaped, in some implementations, the heat sink bracket 790 can be generally U-shaped such that a first portion of the heat sink bracket 790 contacts the first side wall 714A of the housing 710, a second portion of the heat sink bracket 790 contacts the second side wall 714B of the housing 710, and a third portion of the heat sink bracket 790 is coupled to the ferromagnetic strip 750. Similarly, while the heat sink bracket 790 is position in FIG. 7A so that one portion contacts the first side wall 714A of the housing 710, the heat sink bracket 790 can be reversed such that this portion contacts the first side wall 714B of the housing 710 instead of the first side wall 714A.

Figure 8:
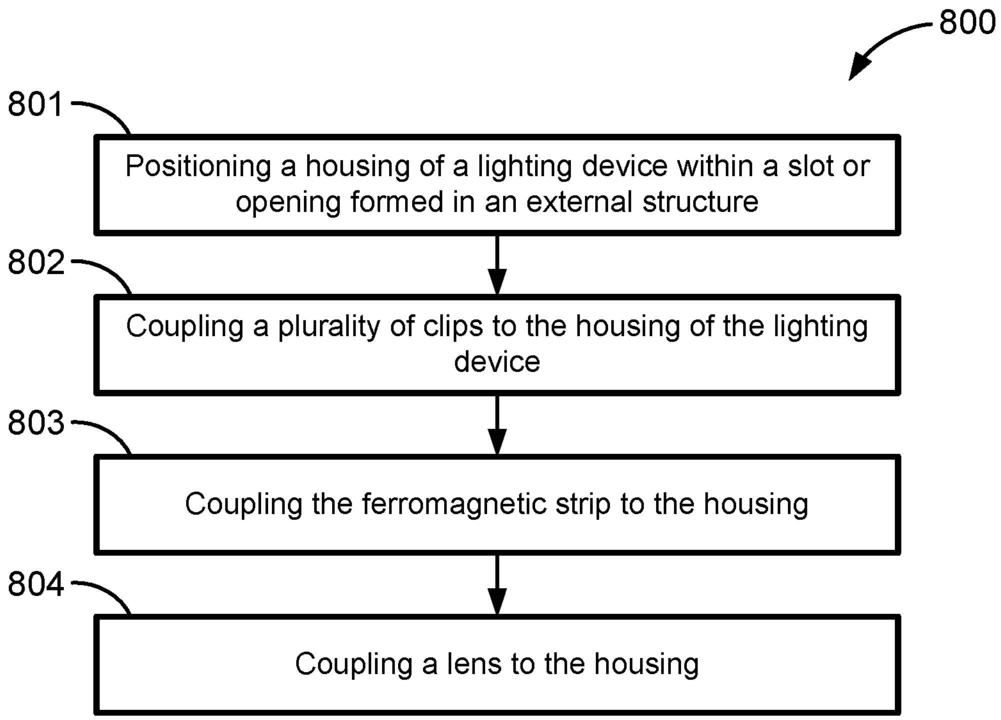
FIG. 8 is a process flow diagram for a method of installing the lighting device of FIG. 1, according to some implementations of the present disclosure.

Referring to FIG. 8, a method 800 for installing a light device according to some implementations of the present disclosure is illustrated. The method 800 can be performed using, for example, the lighting device 100 or the lighting device 700 described herein.

Step 801 of the method 800 includes positioning a housing of a lighting device within a slot or opening formed in an external structure. The external structure can be, for example, a wall (e.g., dry wall supported by wooden or metal studs) or a ceiling (e.g., a drywall ceiling, a drop ceiling, etc.). Referring to FIG. 6, an external structure 200 includes a first portion and a second portion defining and opening or slot. The opening or slot can be a generally rectangular slot formed in the external structure having a width that is substantially equal to the width of the housing 110 of the lighting device 100.

In some implementations, step 801 also includes coupling the housing 110 of the lighting device 100 within the slot via one or more fasteners. For example, referring to FIG. 6, the housing 110 can be secured within the slot 606 or opening via the fastener 180 (e.g., a threaded screw), which extends through an aperture in the housing 110. In some implementations, step 801 includes drilling one or more apertures in the base 112 of the housing 110 for receiving the one or more fasteners therein. For example, step 801 can include drilling a plurality of apertures along the scribed line (described above) of the base 112 of the housing 110.

Step 802 of the method 800 includes coupling a plurality of clips to the housing of the lighting device. For example, as shown and described herein, the plurality of clips 140A-140B can be coupled to the housing 110. In some implementations, step 802 is after step 801. In other implementations, step 802 is before step 801.

Step 803 of the method 800 includes coupling the ferromagnetic strip to the housing of the lighting device. For example, as described above, the ferromagnetic strip 150 (to which the light source 160 is coupled) can be coupled to the housing 110 via the corresponding magnets of the plurality of clips 140A-140B. Step 803 can also include coupling the connector 164 of the power cable 162 of the light source 160 to the connector 132 of the external power cable 130 to form an electrical connection for powering the light source 160. In some implementations, the connector 164 and connector 132 are coupled prior to coupling the ferromagnetic strip 150 to the plurality of clips 140A-140B. In other implementations, the connector 164 and connector 132 are coupled subsequent to coupling the ferromagnetic strip 150 to the plurality of clips 140A-140B.

Step 804 of the method 800 includes coupling a lens to the housing subsequent to coupling the ferromagnetic strip to the housing. Referring to FIGS. 3 and 5, the lens 170 is coupled to the housing 110 via a snap fit coupling. For example, an installer can position the lens 170 so that the first notch 172A engages the first protrusion 118A of the housing 110, then push the lens 170 so that the second notch 172B engages the second protrusion 118B of the housing 110 (or vice versa). In some implementations, step 804 includes measuring and cutting the lens 170 (e.g., from a roll or spool) so that the length of the lens 170 is substantially equal to the length of the housing 110.

Figure 9:
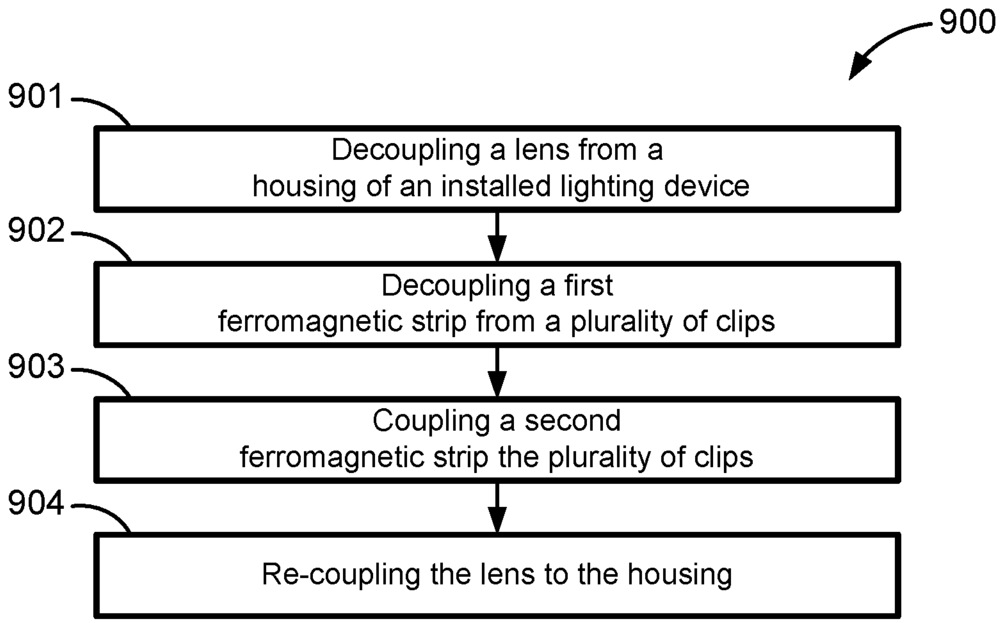
FIG. 9 is a process flow diagram for a method of repairing the lighting device of FIG. 1, according to some implementations of the present disclosure.

Referring to FIG. 9, a method 900 for repairing a lighting device according to some implementations of the present disclosure is illustrated. The method 900 can be performed using, for example, the lighting device 100 or the lighting device 700 described herein after having been installed according to method 700.

Step 901 of the method 900 includes decoupling a lens from a housing of an installed lighting device. For example, as described herein, the lens 170 of the lighting device 100 can be decoupled from the housing 110 subsequent to being initially coupled to the housing 110 (e.g., via a snap fit coupling). In some implementations, step 901 is performed by a user (e.g., the can remove the lens 170 with their hands). In other implementations, step 901 is performed using a tool (e.g., a shim, a flat head screwdriver, or the like, etc.) to aid in removing the lens 170 from the housing 110. In some implementations, step 901 includes removing the entire lens 170 from the housing 110. In other implementations, step 901 includes removing a portion of the lens 170 from the housing 110 (e.g., one segment of the lens 170 is decoupled from the housing 110 while a second segment of the lens 170 remains coupled to the housing 110).

Step 902 of the method 900 includes decoupling a ferromagnetic strip from a plurality of clips, where each of the plurality of clips is coupled to the housing. For example, as described herein, the ferromagnetic strip 150 can be decoupled from the plurality of clips 140A-140B once the lens 170 is removed from the housing 110. In some implementations, step 802 includes decoupling the connector 164 of the power cable 162 of the light source 160 from the connector 132 of the external power cable 130. The decoupling of the connector 164 and connector 132 can be before or after removing the ferromagnetic strip 150 from the plurality of clips 140A-140B.

Step 903 of the method 900 includes coupling a second ferromagnetic strip coupled to a second light source to the housing. The second ferromagnetic strip and the second light source are the same as, or similar to the first ferromagnetic strip and the first light source, respectively.

Step 904 of the method 900 includes re-coupling the lens to the housing after coupling the ferromagnetic strip and the second light source to the housing via the plurality of clips. Step 806 is the same as, or similar to, step 704 of the method 700 (FIG. 7) described above.

In some implementations, the method 900 does not include coupling a second ferromagnetic strip to the housing. Instead, the method 900 can include decoupling the first light source from the first ferromagnetic strip and coupling a second light source to the first ferromagnetic strip. For example, the light source 160 can be pulled from the adhesive strip 152 coupling it to the ferromagnetic strip 150 (e.g., manually by a user or using a tool). In some cases, a portion of the adhesive strip 152 or residue remains on the ferromagnetic strip 150. Thus, in some implementations, the method 900 removing the remaining portion of the adhesive strip 152 mechanically (e.g., scraping using a tool), chemically (e.g., that aids in removing the adhesive), or both. It would be difficult to remove residual from the ferromagnetic strip 150 while it is inside of the housing 110. Thus, removing the first ferromagnetic strip is advantageous because it facilitates removal of the adhesive strip so that another adhesive strip can be attached, as described below. In such implementations, the method 900 also includes re-coupling the first ferromagnetic strip and the second light source to the housing via the plurality of clips.

One or more elements or aspects or steps, or any portion (s) thereof, from one or more of any of the claims below can be combined with one or more elements or aspects or steps, or any portion(s) thereof, from one or more of any of the other claims or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A lighting device comprising:

a housing including a base, a first side wall, a second side wall defining an interior cavity;

a plurality of clips, each of the plurality of clips being coupled to the housing and including a magnet;

a ferromagnetic strip coupled to the housing via the magnets of the plurality of clips;

a light source disposed within the interior cavity of the housing and coupled to the ferromagnetic strip;

a lens disposed within the interior cavity of the housing;

the first side wall of the housing includes a first flange extending into the interior cavity and the second side wall of the housing includes a second flange extending into the interior cavity;

each of the plurality of clips includes a base, a first deflectable arm, and a second deflectable arm; and the first deflectable arm of each of the plurality of clips includes a first hook configured to engage the first flange and the second deflectable arm of each of the plurality of clips includes a second hook configured to engage the second flange to couple the one or more clips to the housing.

2. The lighting device of claim 1, wherein each of the plurality of clips comprises a polymer material.

3. A lighting device comprising:

a housing including a base, a first side wall, a second side wall defining an interior cavity;

a plurality of clips, each of the plurality of clips being coupled to the housing and including a magnet;

a ferromagnetic strip coupled to the housing via the magnets of the plurality of clips;

a light source disposed within the interior cavity of the housing and coupled to the ferromagnetic strip;

a lens disposed within the interior cavity of the housing;

the first side wall of the housing includes a first flange extending into the interior cavity and the second side wall of the housing includes a second flange extending into the interior cavity; and a power cable configured to deliver electrical power from a power supply to the light source, wherein a first portion of the power cable is disposed within the internal cavity of the housing and extends between the first deflectable arm and the second deflectable arm of at least one of the one or more clips.

4. The lighting device of claim 3, wherein the base of the housing includes aperture and a second portion of the power cable extend through the aperture outside of the internal cavity of the housing.

5. The lighting device of claim 3, wherein a first end of the power cable includes a connector.

6. The lighting device of claim 5, wherein the plurality of clips includes a first clip and a second clip and the connector is disposed within the internal cavity of the housing between the first clip and the second clip.

7. The lighting device of claim 1, wherein the lens comprises a flexible material.

8. The lighting device of claim 1, wherein the lens comprises a rigid material.

9. The lighting device of claim 1, wherein the lens comprises polymethyl methacrylate (PMMA).

10. The lighting device of claim 1, wherein the first side wall of the housing includes a first protrusion extending into the internal cavity and the second side wall of the housing includes a second protrusion extending into the internal cavity.

11. The lighting device of claim 10, wherein a first side of the lens includes a first groove configured to engage the first protrusion and a second side of the lens includes a second groove configured to engage the second protrusion to couple the lens to the housing.

12. The lighting device of claim 1, further comprising one or more double-sided adhesive strips configured to couple the light source to the ferromagnetic strip.

13. The lighting device of claim 1, wherein the light source includes a plurality of light emitting diodes (LEDs) coupled to a support substrate, wherein the support substrate is coupled to the ferromagnetic strip.

14. The lighting device of claim 1, further comprising a first end cap coupled to a first end of the housing and second end cap coupled to a second end of the housing.

15. The lighting device of claim 14, wherein the housing includes an upper groove extending between the first end and the second end of the housing, the first end cap includes a first tongue configured to engage the upper groove to aid in coupling the first end cap to the first end of the housing, and the second end cap includes a second tongue configured to engage the upper groove to aid in coupling the second end cap to the second end of the housing.

16. The lighting device of claim 1, wherein the ferromagnetic strip includes a protective coating comprising a zinc and aluminum alloy.

17. The lighting device of claim 1, further comprising a heat sink bracket configured to aid in transferring heat generated by the light source from the ferromagnetic strip to the housing, wherein a first portion of the heat sink bracket is positioned between the light source and the ferromagnetic strip and a second portion of the heat sink bracket directly contacts the first side wall or the second side wall of the housing.

18. The lighting device of claim 3, wherein the lens comprises a flexible material.

19. The lighting device of claim 3, wherein the lens comprises a rigid material.

20. The lighting device of claim 3, wherein the lens comprises polymethyl methacrylate (PMMA).

21. The lighting device of claim 3, wherein the first side wall of the housing includes a first protrusion extending into the internal cavity and the second side wall of the housing includes a second protrusion extending into the internal cavity.

22. The lighting device of claim 21, wherein a first side of the lens includes a first groove configured to engage the first protrusion and a second side of the lens includes a second groove configured to engage the second protrusion to couple the lens to the housing.

23. The lighting device of claim 3, further comprising one or more double-sided adhesive strips configured to couple the light source to the ferromagnetic strip.

24. The lighting device of claim 3, wherein the light source includes a plurality of light emitting diodes (LEDs) coupled to a support substrate, wherein the support substrate is coupled to the ferromagnetic strip.

25. The lighting device of claim 3, further comprising a first end cap coupled to a first end of the housing and second end cap coupled to a second end of the housing.

26. The lighting device of claim 25, wherein the housing includes an upper groove extending between the first end and the second end of the housing, the first end cap includes a first tongue configured to engage the upper groove to aid in coupling the first end cap to the first end of the housing, and the second end cap includes a second tongue configured to engage the upper groove to aid in coupling the second end cap to the second end of the housing.

27. The lighting device of claim 3, wherein the ferromagnetic strip includes a protective coating comprising a zinc and aluminum alloy.

28. The lighting device of claim 3, further comprising a heat sink bracket configured to aid in transferring heat generated by the light source from the ferromagnetic strip to the housing, wherein a first portion of the heat sink bracket is positioned between the light source and the ferromagnetic strip and a second portion of the heat sink bracket directly contacts the first side wall or the second side wall of the housing.

* * * * *